UNITED STATES PATENT OFFICE.

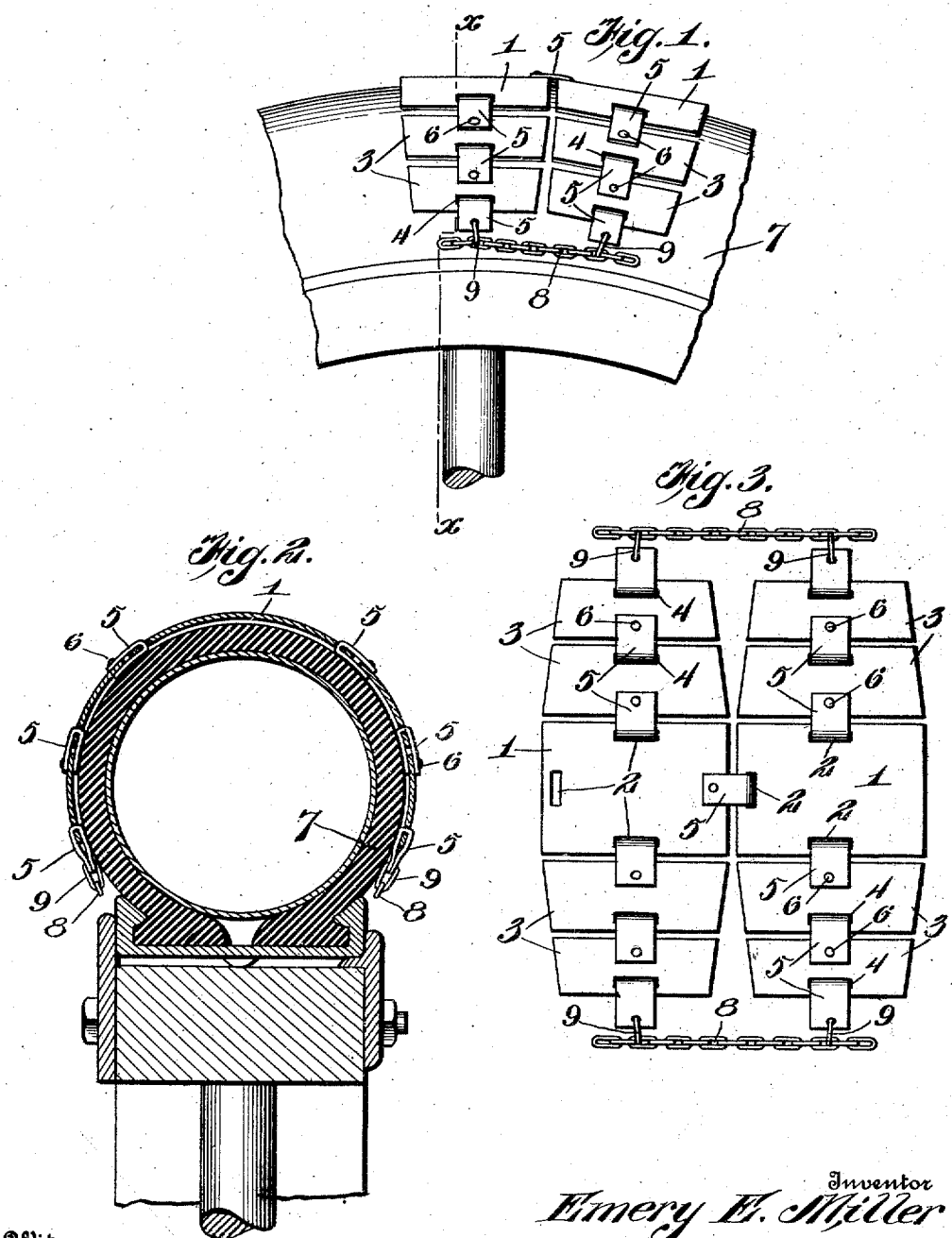

EMERY E. MILLER, OF LEWISBURG, PENNSYLVANIA.

PNEUMATIC-TIRE PROTECTOR.

1,207,594.  Specification of Letters Patent.  Patented Dec. 5, 1916.

Application filed December 6, 1913. Serial No. 805,137.

*To all whom it may concern:*

Be it known that I, EMERY E. MILLER, a citizen of the United States, residing at Lewisburg, in the county of Union and State of Pennsylvania, have invented new and useful Improvements in Pneumatic-Tire Protectors, of which the following is a specification.

The primary purpose of the invention is to prolong the life of pneumatic tires and prevent puncture and blowout this being accomplished by means of a covering of novel formation, said covering being flexible and comprising a plurality of linked plates which are of such relative size and form as to completely inclose the tread portion and sides of the tire, thereby preventing injury thereto when coming in contact with sharp objects.

The invention further provides a protector which will also act to increase the traction and prevent skidding, said protector being of such formation as to be readily placed in position upon the tire or removed therefrom as desired.

The invention consists of the novel features, details of construction and combination of parts, which hereinafter will be more particularly set forth, illustrated in the accompanying drawing, and pointed out in the appended claim.

Referring to the drawing forming a part of the specification, Figure 1 is a side view of part of a pneumatic tire provided with a protector embodying the invention. Fig. 2 is a transverse section on the line x—x of Fig. 1. Fig. 3 is a plan view of a portion of the protector flattened to show more clearly the relation of the several parts.

Corresponding and like parts are referred to in the following description and indicated in all the views of the drawing, by the same reference characters.

The protector comprises a plurality of metal plates which are so formed and linked together as to completely inclose the tread and side portions of the tire and which are yieldable so as not to detract from the efficiency of the tire in neutralizing shock and vibration. The protector comprises intermediate side plates, the intermediate plates lying against the tread of the tire and the side plates extending along the sides of such tire. The intermediate plates 1 are approximately of rectangular form and are provided in three of their edges with elongated openings 2. There are similar and corresponding plates at the sides of each of the intermediate plates 1 and each of such side plates is of the form of a trapezoid, the outermost plates being slightly smaller than the plates adjacent the intermediate plates 1. The side plates 3 are relatively narrow and long and are arranged with their length in the direction of the length of the tire. Each of the side plates 3 has a centrally disposed oblong opening 4 near its outer edge. The several plates are connected by means of links 5 each of such links consisting of a short strap which is passed through one of the openings 2 or 4 and doubled upon itself and embracing opposite sides of the adjacent plate to which it is secured by means of a rivet 6 or like fastening. The links 5 besides serving as connecting means between the plates also result in the provision of projections which serve to sustain the wear and prevent slipping or skidding. The several plates are of metal and preferably consist of sheet steel which is light and capable of sustaining severe strain and wear, the size and outline of the plates are such as to enable the edges of adjacent plates to practically touch or come close together, thereby completely enveloping the tire 7 and preventing the exposure for the penetration of any sharp object which would be likely to result in puncture.

The protector is retained in place upon the tire 7 by means of side binders 8 which preferably are in the form of chains, said binders being connected to the outermost links 5 of the extreme side plate 3 by means of links 9. It is to be understood that each of the side binders is provided with a separable link to admit of placing the protector in position or remove it from the tire. When the protector is in position upon the tire it conforms to the outer side thereof and is prevented from lateral displacement and is free to move around the tire in the manner well understood to prevent injury thereto.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new is:—

In combination a wheel having a tire, a tire protector consisting of a number of curved plates adapted to extend around the tread and sides of said tire transversely thereof, some of said plates being formed at opposite ends with substantially rectangular openings, a series of strap links each consisting of a doubled member having two arms curved to the configuration of said tire, each of said links having its looped portion linked loosely through the rectangular opening of one of said plates and straddling one marginal edge thereof and also the marginal edge of an adjacent plate, pins passing through the arms of some of said links and serving as a means of separating the confronting edges of adjacent plates for relative movement, and means adapted to hold said plates against displacement from the tire.

In testimony whereof I affix my signature in presence of two witnesses.

EMERY E. MILLER.

Witnesses:
 JOHN W. HEINLEY,
 G. T. BIEHL.